United States Patent [19]
Kimpel et al.

[11] 4,083,397
[45] Apr. 11, 1978

[54] HEATING-COOLING CONTROL SYSTEM

[75] Inventors: Francis A. Kimpel; Walter C. Moore, both of York, Pa.

[73] Assignee: Borg-Warner Corporation, Chicago, Ill.

[21] Appl. No.: 702,789

[22] Filed: Jul. 6, 1976

[51] Int. Cl.² ...................... H01H 37/52; F25B 29/00
[52] U.S. Cl. ..................................... 165/26; 236/1 C; 337/340; 361/191
[58] Field of Search .................... 165/26, 27; 307/117; 236/1 C, 68 B; 340/176, 310 A; 361/163, 191; 337/340, 337

[56] References Cited
U.S. PATENT DOCUMENTS

| | | | |
|---|---|---|---|
| 2,188,877 | 1/1940 | Kriechbaum | 236/1 C |
| 2,992,366 | 7/1961 | Veltfort, Jr. | 361/191 X |
| 3,193,198 | 7/1965 | Carlson | 236/1 C |
| 3,284,002 | 11/1966 | Edelman et al. | 236/68 B |

OTHER PUBLICATIONS

Switching Tricks, Radio-Electronics, May, 1972, pp. 54 & 55.

*Primary Examiner*—William E. Wayner
*Attorney, Agent, or Firm*—James E. Tracy

[57] ABSTRACT

Thermostat control of separate heating and cooling apparatus is achieved with a system that requires only a two-conductor connection between the thermostat and the apparatus. A pair of oppositely-poled diodes is employed at each end of one of the conductors of the connection so that when the control system is established, by a selector switch, in the heating mode the half cycles of one polarity of an AC voltage effect the operation of the heating apparatus, whereas when the system is switched to the cooling mode the opposite polarity half cycles cause operation of the cooling apparatus. The invention is especially advantageous when a central air-conditioning system is added to a building where only a two-wire cable connects the thermostat to the existing heating system. Rewiring of the thermostat cable is unnecessary.

1 Claim, 1 Drawing Figure

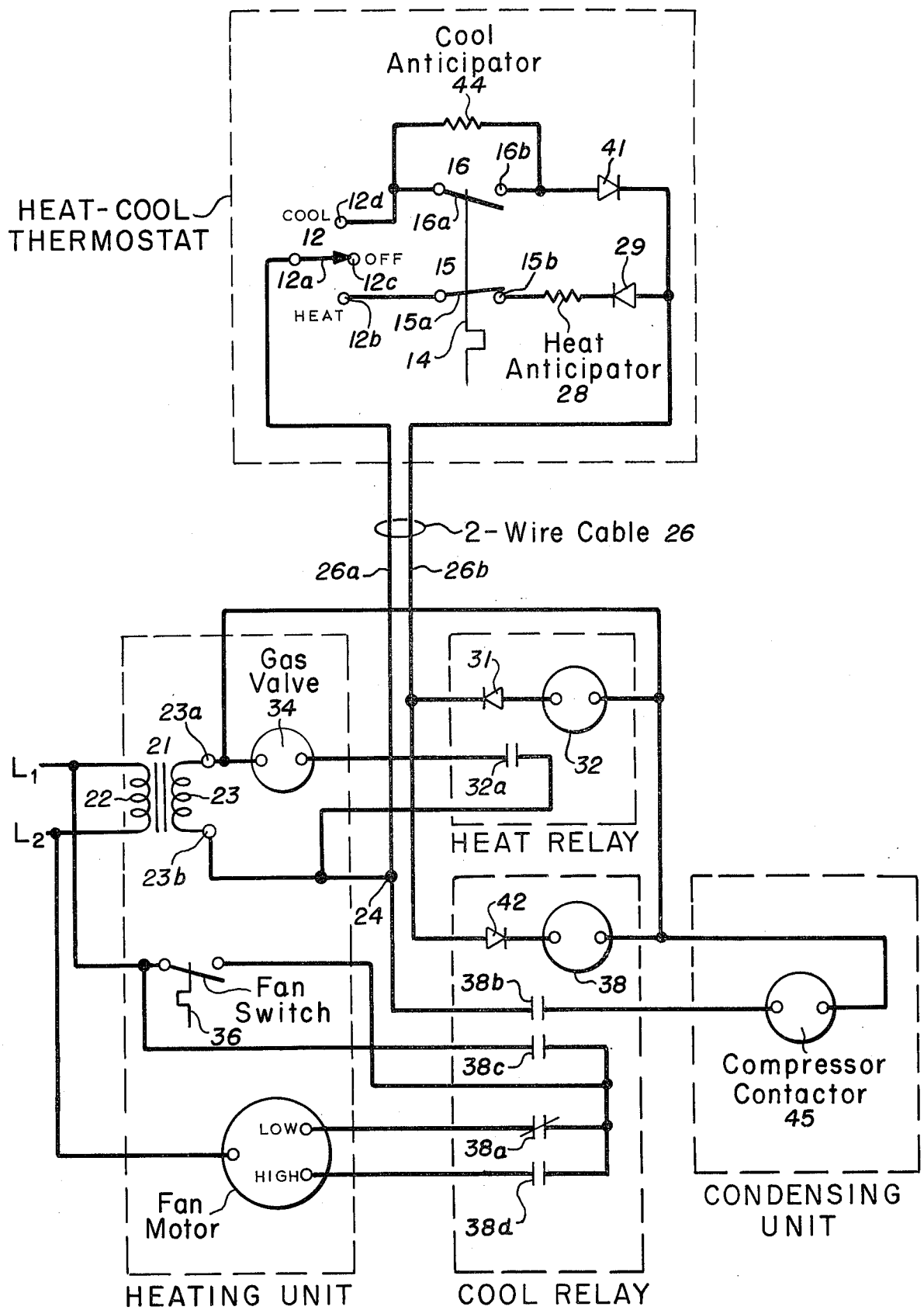

HEATING-COOLING CONTROL SYSTEM

BACKGROUND OF THE INVENTION

This invention relates to a control arrangement for thermostatically controlling both heating and cooling apparatus by means of a single heat-cool thermostat. Usually, a three-wire or three-conductor cable is needed to couple a remotely located heat-cool thermostat to the heating and cooling equipment to properly control that equipment. One of the conductors is common for both heating and cooling, while the second conductor is used only for heating control and the third only for cooling control. The necessity of a three-wire connection is particularly disadvantageous when air-conditioning equipment is added to a building which already has an existing thermostat-controlled heating system connected to the thermostat by only a two-wire cable. Installation of the required three-wire cable in an existing building where all the walls, ceilings and floors are finished is, of course, a time consuming and an expensive task.

The present invention obviates the need for a three-wire cable between the thermostat and the heating and cooling apparatus by providing a control arrangement requiring only a two-wire connection. Hence, rewiring is not necesary and the existing two-wire cable can be used for both heating and cooling control when cooling equipment is added.

The control system of the present invention is also useful in new construction since, in many installations, it is far less expensive than the conventional three-wire control.

SUMMARY OF THE INVENTION

The heating-cooling control system of the invention thermostatically controls the operation of heating and cooling apparatus to regulate the temperature in a space to which treated (heated or cooled) air is supplied by that apparatus. The system comprises a heat-cool thermostat, located in the space to be temperature controlled, having a heat-off-cool selector switch for establishing the control system in either heating, cooling or off modes. A controlled circuit, located relatively close to the heating and cooling apparatus, incldes first and second controlled devices (such as relay coils) which, when energized, renders operable the heating and cooling apparatus respectively. A two-conductor cable couples the thermostat to the controlled circuit. Means, including the two-conductor cable and a first pair of similarly poled diodes, applies the half cycles of one polarity of an alternating voltage (provided by an AC power supply) to the first controlled device to facilitate energization thereof when the control system is in the heating mode. Finally, the control system of the invention comprises means, including the two-conductor cable and a second pair of similarly poled diodes, for applying the opposite polarity half cycles of the alternating voltage to the second controlled device to facilitate energization thereof when the control system is established in the cooling mode.

DESCRIPTION OF THE DRAWING

The features of the invention which are believed to be novel are set forth with particularity in the appended claims. The invention, together with further advantages and features thereof, may best be understood, however, by reference to the following description in conjunction with the accompanying drawing which schematically illustrates a heating-cooling control system, constructed in accordance with the invention, and the manner in which the system thermostatically controls the operation of heating and cooling apparatus.

DESCRIPTION OF THE ILLUSTRATED EMBODIMENT

The heat-cool thermostat is mounted in the area to be temperature controlled. With the exception of the two diodes, its construction is conventional. A typical heat-cool thermostat may thus easily be modified merely by adding a pair of diodes. More specifically, the thermostat includes a three-position, heat-off-cool selector switch 12 having a movable contact 12a and three fixed contacts 12b, 12c and 12d. The control system is established in the heating mode when switch 12 is adjusted to the heat position wherein movable contact 12a engages fixed contact 12b, and in the cooling mode when the switch is moved to the cool position in which contact 12a mates with contact 12d. The control system is turned off (the off mode) when selector switch 12 is set in its off position wherein contact 12a engages unconnected contact 12c. Temperature-sensing bimetallic element or bimetal 14 positions movable contacts 15a and 16a, of switches 15 and 16 respectively, in response to the ambient temperature and as determined by the temperature to which the thermostat is set. As illustrated, the temperature at bimetallic element 14 is below the set point temperature so contact 15a engages fixed contact 15b. With switch 15 closed, the thermostat is calling for heat. Of course, since the space to be temperature controlled is colder than the set point temperature, switch 16 will be open.

Line conductors $L_1$ and $L_2$ represent a conventional single phase AC power supply or source available in the building where the control system is installed. Customarily, the line voltage across conductors $L_1$ and $L_2$ will have a magnitude of approximately 120 volts and a commutating frequency of 60 cycles per second or hertz. Since a lower magnitude AC voltage is preferred for operating the control system, a step-down transformer 21 is employed to reduce the line voltage. Usually, heating-cooling control circuits in residences and light commercial buildings (where the invention is most applicable) are operated by an AC source of about 24 volts. It will, therefore, be assumed that secondary winding 23 provides a source of 24 volts AC between terminals 23a and 23b.

Of course, the waveshape of the alternating voltage produced across secondary winding 23 will be substantially the same as that applied to primary winding 22. Hence, the instantaneous voltage at terminal 23a of winding 23 alternates in generally sinusoidal fashion above (or positive) and below (or negative) relative to the instantaneous voltage found on terminal 23b.

With selector switch 12 in the off position as shown, nothing is energized and neither the heat apparatus nor the cooling apparatus will be rendered operable. Assume now that the selector switch is switched to the heat position to establish the control system in the heating operating mode. If the temperature at the thermostat is above the set point, switch 15 will be held open by bimetallic element 14 and the heating apparatus in the furnace will remain deenergized. If the temperature now drops below the set point in the space controlled, switch 15 will be closed by bimetal 14 and a DC circuit will be completed across secondary winding 23 via the following path: terminal 23b, circuit junction or node 24, conductor 26a of two-conductor or two-wire cable 26, contacts 12a, 12b, 15a and 15b, heat anticipator resistor 28, diode 29, conductor 26b, diode 31, controlled device or relay coil 32 and terminal 23a. Due to the presence of similarly poled diodes 29 and 31, current flows through the DC circuit in one direction only and only half of the time. In other words, pulsating DC current will flow through coil 32 of the heat relay. To explain further, since a diode conducts only when its anode is positive relative to its cathode, the energizing circuit for relay coil 32 conducts only during the half cycles of one polarity of the alternating voltage produced by winding 23, namely the half cycles or half waves when terminal 23a is positive with respect to terminal 23b.

Coil 32 is appropriately constructed so that it remains energized in response to the pulsating DC current, the pulses occurring, of course, at the rate of 60 per second. For some relay coils, it may be desirable to shunt them with capacitors to insure that they remain energized. Normally-open relay contacts 32a close, in response to the operation of the heat relay, and couple gas valve 34 across secondary winding 23, whereupon the valve opens and admits gas to the heating apparatus. Of course, while a gas-fired heating unit is illustrated, the invention is applicable to any type heating system.

In conventional manner, after the air in the heating chamber has been sufficiently heated, bimetallic element 36 closes the fan switch to complete an energizing circuit from line conductors $L_1$ and $L_2$, and via the normally-closed contacts 38a of the cool relay, to the low speed input of the circulating fan motor. The circulating fan therefore operates at its low speed in order to deliver heated air to the space where the thermostat is located.

Bimetallic element 14 responds to the increased temperature in the controlled space, and when the set point is reached, switch 15 will be opened to cause deenergization of the heat relay and closing of gas valve 34. Actually, switch 15 opens slightly before the ambient temperature rises to the set point by virtue of the effect of series-connected heat anticipator resistor 28 which is thermally coupled to bimetal 14. In well-known fashion, the current flowing through the heat anticipator dissipates energy and generates heat for application to bimetal 14 to cause the thermostat to be heated more rapidly than otherwise would be the case if such heating were due solely to the increase in ambient temperature. The result is that the thermostat is satisfied sooner and interrupts the operation of the heating apparatus slightly before the ambient temperature rises to the set point. This is desirable since a certain time lag exists between the production of heated air and its delivery to the immediate region of the thermostat. Such termination of the call for heat before the heat has actually been delivered to the space in which the thermostat is located causes the thermostat to, in effect, anticipate the arrival of the heat. The fan switch functions in conventional manner to maintain operation of the circulating fan until all of the heated air has been expelled from the furnace and supplied to the controlled space.

Assume now that selector switch 12 is adjusted to its cool position to establish the control system in the cooling mode and assume further that the ambient temperature is above the set point. Switch 16 will therefore be closed and a DC circuit will be completed across winding 23 via the following path: terminal 23b, node 24, conductor 26a, contacts 12a, 12d, 16a and 16b, diode 41, conductor 26b, diode 42, controlled device or relay coil 38 and terminal 23a. Diodes 41 and 42 are similarly poled in the DC circuit but are oppositely poled relative to diodes 29 and 31. Accordingly, in the cooling mode the opposite polarity half cycles of the AC voltage, provided by winding 23, produce pulsating current flow through relay coil 38. More specifically, current flows through coil 38 only during the half cycles or half waves when terminal 23b is positive relative to terminal 23a. Of course, coil 38 is also suitably constructed so that it remains energized even though its energizing current is pulsating at a rate of 60 pulses per second. It will now be appreciated that by employing a pair of oppositely poled diodes at each end of conductor 26b, that single conductor can be used for both heat and cool control, passing current in one drection (toward the thermostat) for heat control and in the opposite direction (away from the thermostat) for cool control.

Energization of the cool relay effects operation of the cooling or air-conditioning apparatus in conventional manner. More particularly, normally-open contacts 38b are closed by coil 38 in order to connect compressor contactor 45 to winding 23, thereby rendering the condensing unit operable. At the same time, coil 38 closes normally-open contacts 38c and 38d and opens contacts 38a. As a result, the circulating fan is turned on and operated at its high speed. Cooled air is thus supplied to the temperature controlled area and when the ambient temperature drops to the set point, bimetal 14 opens switch 16 whereupon the cooling equipment is deenergized.

As is well known, the function of shunt-connected cool anticipator resistor 44, which is thermally coupled to bimetallic element 14, is essentially the reverse of that of the heat anticipator. During the cooling mode, but when cooling is not called for (namely during the off cycle), switch 16 will be open and resistor 44 will conduct via the same DC circuit previously described for relay coil 38. Of course, the resistance of resistor 44 will be sufficiently high to limit the current to a value insufficient to energize the cool relay at that time. The heat generated by resistor 44 during the off cycle artificially heats bimetal 14 to cause the cooling apparatus to operate slightly before it normally would in response to the rising ambient temperature alone. During the cooling cycle, resistor 44 is shorted out and the temperature at bimetal 14 drops as a result of the termination of heat from resistor 44. In effect, the cooling produced by the cooling apparatus is anticipated. The absence of heat from the cool anticipator causes bimetal 14 to open switch 16 slightly before it otherwise would in response to the decreased ambient temperature alone.

Of course, while the controlled devices in the controlled circuit take the form of relays, many other devices obviously can be used to turn on the heating and cooling apparatus. For example, solid state switches may be employed in place of the heat and cool relays.

The invention provides, therefore, a unique heating-cooling control system for thermostatically controlling the operation of remote heating and cooling apparatus, only a two-conductor cable being necessary to connect the thermostat to the controlled circuitry which is located in proximity to the heating and cooling apparatus. The use of a two-wire instead of a three-wire connection permits an existing heating unit, controlled by a conventional two-wire thermostat, to be expanded by the addition of a cooling unit without the need for rewiring the connection between the thermostat and the units.

While a particular embodiment of the invention has been shown and described, modifications may be made, and it is intended in the appended claims to cover all such modifications as may fall within the true spirit and scope of the invention.

We claim:

1. A heating-cooling control system for thermostatically controlling the operation of heating and cooling apparatus to regulate the temperature in a space to which treated air is supplied by that apparatus, comprising:

an adjustable heat-cool thermostat, located in the space to be temperature controlled, including a heat-off-cool selector switch having a movable contact and first and second fixed contacts, and first and second switches, positioned by a temperature-sensing device, coupled to said first and second fixed contacts, respectively, the control system being established in a heating mode when said movable contact engages said first fixed contact and in a cooling mode when said movable contact engages said second fixed contact, said first switch being closed by said temperature-sensing device when the ambient temperature in the space to be temperature controlled is below the desired set point temperature to which the thermostat is adjusted and said second switch being closed by said temperature-sensing device when the ambient temperature is above the desired set point temperature;

an AC power supply having a pair of output terminals across which an alternating voltage is produced;

a two-conductor cable;

means, including one conductor of said cable, for coupling said movable contact of said heat-off-cool selector switch to one of the output terminals of said AC power supply;

a first relay coil which, when energized, renders the heating apparatus operable;

a first series DC circuit, including said first switch, a first pair of similarly poled diodes, the other conductor of said cable and said first relay coil, coupled between said first fixed contact of said selector switch and the other output terminal of said AC power supply to facilitate energization of said first relay coil, in response to the half cycles of one polarity of the alternating voltage, when the control system is established in the heating mode and said first switch is closed by said temperature-sensing device;

a second relay coil which, when energized, renders the cooling aparatus operable;

and a second series DC circuit, including said second switch, a second pair of similarly poled diodes, said other conductor of said cable and said second relay coil, coupled between said second fixed contact of said selector switch and said other output terminal of said AC power supply to facilitate energization of said second relay coil, in response to the opposite polarity half cycles of the alternating voltage, when the control system is established in the cooling mode and said second switch is closed by said temperature-sensing device.

* * * * *